(12) United States Patent
Kamiyama et al.

(10) Patent No.: US 6,368,995 B1
(45) Date of Patent: Apr. 9, 2002

(54) SOLID CATALYSTS FOR THE POLYMERIZATION OF OLEFINS AND PROCESS FOR THE PRODUCTION OF OLEFIN POLYMERS THEREWITH

(75) Inventors: Sakae Kamiyama, Chiba; Toshifumi Takemori, Ichihara; Minoru Iijima, Ichihara; Yukiko Hane, Ichihara; Shigeharu Yamamoto, Yotsukaido, all of (JP)

(73) Assignee: Maruzen Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/530,264

(22) PCT Filed: Dec. 11, 1998

(86) PCT No.: PCT/JP98/05621

§ 371 Date: Jun. 8, 2000

§ 102(e) Date: Jun. 8, 2000

(87) PCT Pub. No.: WO00/14122

PCT Pub. Date: Mar. 16, 2000

(30) Foreign Application Priority Data

Sep. 9, 1998 (JP) ............................................. 10-255194

(51) Int. Cl.[7] ........................... B01J 31/22; B01J 31/38; C08F 4/58
(52) U.S. Cl. ........................ 502/116; 502/110; 502/111; 502/152; 502/156; 526/160; 526/165; 526/128; 526/151
(58) Field of Search ................................ 502/110, 111, 502/116, 152, 156; 526/160, 165, 128, 151

(56) References Cited

FOREIGN PATENT DOCUMENTS

| | | |
|---|---|---|
| EP | 0 206 794 | 12/1986 |
| JP | 62-56411 | 3/1987 |
| JP | 63-280703 | 11/1988 |
| JP | 64-6003 | 1/1989 |
| JP | 64-6004 | 1/1989 |
| JP | 64-6005 | 1/1989 |
| JP | 64-11104 | 1/1989 |
| JP | 64-11105 | 1/1989 |
| JP | 4-331206 | 11/1992 |
| JP | 6-287214 | 10/1994 |
| JP | 7-268029 | 10/1995 |
| JP | 8-176225 | 7/1996 |
| JP | 9-241316 | 9/1997 |

*Primary Examiner*—David W. Wu
*Assistant Examiner*—Caixia Lu
(74) *Attorney, Agent, or Firm*—Oliff & Berridge, PLC

(57) ABSTRACT

A solid catalyst for olefin polymerization, obtained by reacting a least one of a hydropolysiloxane compound, having the formula $R^1_a H_b SiO_{(4-a-b)/2}$, a silane compound of formula $R^2_c Si(OH)_{4-c}$, and condensates of the silane, with a compound of formula $(MgR^3_2)_p \cdot (R^3 MgX)_q$ to form a reaction product. The reaction product is reacted with an alcohol, having 1 to 4 carbon atoms, to obtain an intermediate product. The intermediate product, is then reacted with water to obtain reaction product. An organoaluminum oxy compound and a metallocene compound are carried on the solid reaction product. The solid catalyst may be used for olefin polymerization. The catalyst requires no deashing treatment and produces a polymer having high bulk density and narrow particle size distribution. Thus the solid catalystenables control of particle size of the polymer in a simple easy manner, and shows no adhesion of polymer onto the inner wall of autoclave.

4 Claims, No Drawings

_US 6,368,995 B1_

SOLID CATALYSTS FOR THE POLYMERIZATION OF OLEFINS AND PROCESS FOR THE PRODUCTION OF OLEFIN POLYMERS THEREWITH

TECHNICAL FIELD

The present invention relates to a solid catalyst for olefin polymerization and to a process for producing olefinic polymers by using the solid catalyst. More particularly, it relates to a solid catalyst for olefin polymerization which requires no deashing treatment because of high polymerization activity and efficiently produces polymers having excellent powder properties such as high bulk density, narrow particle size distribution, low contents of large particles and fine powder and so on, and to a process for producing olefinic polymers by polymerization or copolymerization of olefins by using such a solid catalyst.

BACKGROUND ART

In recent year, Kaminsky type catalysts, which attract attention as general purpose catalysts for olefin polymerization, comprise a metallocene compound and an organoaluminum oxy compound and have features such that they give polyolefins having high activities and narrow molecular weight distributions, and when applied to copolymerization, give polymers having uniform composition. However, the catalysts are homogeneous catalysts so that produced polymer particles are fine, resulting in that not only they are difficult to handle but also they cause fouling. Therefore, it has been practically impossible to apply them to slurry polymerization methods or gas phase polymerization methods, which are major processes of polyolefin production.

To solve these problems, researches have been made to have at least one component of the metallocene compound and organoaluminum oxy compound carried on a solid carrier to improve the properties of powder. For example, Japanese Patent Application Laid-open Nos. Sho 61(1986)-296008 and Sho 63(1988)-280703 disclose solid catalysts for olefin polymerization comprising the above catalyst components carried on porous inorganic oxide carriers such as silica, alumina, and silica-alumina.

Also, Japanese Patent Application Laid-open Nos. Sho 64 (1989)-6003, Sho 64(1989)-6004, Sho 64(1989)-6005, Sho 64(1989)-11104, and Sho 64(1989)-11105 disclose solid catalyst components containing as one component an organic magnesium compound particularly in a liquid state and processes for obtaining olefin polymers having excellent powder properties by using such solid catalyst components. Further, in relation to the improvement of powder properties, Japanese Patent Application Laid-open No. Hei 6(1994)-256411 discloses a solid catalyst containing various metal salts such as anhydrous magnesium carbonate as a carrier, Japanese Patent Application Laid-open No. Hei 7(1995)-268029 discloses a catalyst component for polymerization containing Lewis acid solid such as magnesium dichloride as a carrier, and Japanese Patent Application Laid-open No. Hei 8(1996) -176225 discloses a catalyst for olefin polymerization comprising a solid component obtained by reaction of a specific magnesium compound and an aluminum compound.

Although the catalysts described in these publications are generally improved in adaptivity to slurry polymerization methods and gas phase polymerization methods, they are often accompanied by a decrease in the activity of catalyst and insufficient in improving the powder properties of polymer to a satisfactory level without decreasing the activity of catalyst. In particular, the above references contain only qualitative description on particle size distribution, which together with bulk density is an important feature of powder properties, but fail to disclose data to support its effect specifically. Further, these references disclose nothing on the process for easily controlling particle diameter, which is an important element of the production technology by a slurry polymerization method or gas phase polymerization method.

Accordingly, an object of the present invention is to provide a solid catalyst for olefin polymerization which (1) requires no deashing treatment because of high polymerization activity, (2) produces polymers having excellent powder properties such as high bulk density, narrow particle size distribution and low contents in large particles and fine powder, (3) allows easy control of the particle diameter of the obtained polymer, and (4) shows less fouling on the autoclave upon polymerization. Another object of the present invention is to provide a process for producing olefinic polymers by using such a solid catalyst for olefin polymerization.

DISCLOSURE OF INVENTION

The present inventors have made intensive research in order to solve the above problems and have found that use of a solid reaction product obtained by reacting components such as a specific organic silicon compound and an organic magnesium compound under specific conditions can give rise to a solid catalyst for olefin polymerization that achieves the above objects, thus accomplishing the present invention.

That is, in a first aspect, the present invention provides a solid catalyst [F] for olefin polymerization, obtained by reacting at least one organic silicon compound selected from a hydropolysiloxane compound having a structural unit represented by general formula, $R^1{}_a H_b SiO_{(4-a-b)/2}$ (wherein $R^1$ is a monovalent organic group selected from an alkyl group, an aryl group, an aralkyl group, an alkoxy group, and an aryloxy group, a is an integer of 0 to 2, b is an integer of 1 to 3, provided that $a+b \leq 3$), a compound composed of silicon atom to which at least one organic group and at least one hydroxyl group are bonded, represented by general formula, $R^2{}_c Si(OH)_{4-c}$ (wherein $R^2$ is a monovalent hydrocarbon group having 1 to 18 carbon atoms and c is an integer of 1 to 3) and condensates thereof with an organic magnesium compound represented by general formula $(MgR^3{}_2)_p \cdot (R^3 MgX)_q$ (wherein $R^3$ is a hydrocarbon group, X is a halogen atom, p and q are numbers of 0 or 1, provided that $p+q=1$) to form a reaction product [A], reacting the reaction product [A] with an alcohol having 1 to 4 carbon atoms to obtain an intermediate product [B], reacting the intermediate product [B] with water to obtain a solid reaction product [C], and having an organoaluminum oxy compound [D] and a metallocene compound [E] carried on the solid reaction product [C].

In a second aspect, the present invention provides a process for producing olefinic polymers, characterized by polymerization or copolymerization of olefins in the presence of the above solid catalyst [F] for olefin polymerization and an organoaluminum compound [G].

Hereinafter, the solid catalyst for olefin polymerization (hereafter, sometimes referred to simply as "solid catalyst" for brevity) according to the present invention and a process for producing olefinic polymer using the said solid catalyst will be described concretely.

In the present invention, a group of the organic silicon compounds used in the preparation of the reaction product

[A] are hydropolysiloxane compounds having a structural unit represented by the general formula (1)

$$R^1_a H_b SiO_{(4-a-b)/2} \quad (1)$$

wherein $R^1$ is a monovalent organic group selected from an alkyl group, an aryl group, an aralkyl group, an alkoxy group, and an aryloxy group, a is an integer of 0 to 2, b is an integer of 1 to 3, provided that a+b≦3. The degree of polymerization thereof is not particularly limited and either liquid or solid state compound may be used. The terminal of the hydropolysiloxane may be substituted with any inert group, for example, a trialkylsilyl group.

Examples of the hydropolysiloxane compound represented by the general formula (1) include tetramethyldisiloxane, biphenyl disiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane, chlorophenylhydropolysiloxane and so on.

Another group of the organic silicon compound used in the preparation of the reaction product [A] are compounds composed of a silicon atom to which at least one organic group and at least one hydroxyl group are bonded, represented by the general formula (2)

$$R^2_c Si(OH)_{4-c} \quad (2)$$

wherein $R^2$ is a monovalent hydrocarbon group having 1 to 18 carbon atoms and c is an integer of 1 to 3, and condensates thereof.

Here, specific examples of the hydrocarbon group $R^2$ include an alkyl group, a cycloalkyl group, an aralkyl group, an aryl group, and an alkaryl group. These groups may be straight chain, branched chain, saturated, unsaturated, or cyclic. When plural $R^2$s are present, they may be the same or different.

Examples of the compound represented by general formula (2) composed of a silicon atom to which at least one organic group and at least one hydroxyl group are bonded include butyltrihydroxysilane, phenyltrihydroxysilane, trimethylhydroxysilane, triethylhydroxysilane, triphenylhydroxysilane, methyldiphenylhydroxysilane, benzyldiphenylhydroxysilane and so on.

Examples of the polysiloxane type compound that is a condensate of the compound represented by general formula (2) composed of a silicon atom to which at least one organic group and at least one hydroxyl group are bonded include α, ω-dihydroxydimethylpolysiloxane, α, ω-dihydroxymethylphenylpolysiloxane and so on.

The organic silicon compound used in the present invention may be selected optionally from the hydropolysiloxane compounds represented by the general formula (1) and the compounds represented by general formula (2) composed of a silicon atom to which at least one organic group and at least one hydroxyl group are bonded and condensates of the compounds represented by the general formula (2) and does not have to be limited to one compound and may be a mixture of two or more compounds.

In the present invention, the organic magnesium compound used in the preparation of the reaction product [A] is a compound represented by general formula (3)

$$(MgR^3_2)_p \cdot (R^3 MgX)_q \quad (3)$$

wherein $R^3$ is a hydrocarbon group, X is a halogen atom, p and q are numbers of 0 to 1, provided that p+q=1, or ether complexes thereof.

Specific examples of the organic magnesium compound include Grignard reagents in narrower sense represented by $R^3 MgX$, dihydrocarbylmagnesium represented by $MgR^3_2$ and so on. Here, $R^3$ may be, for example, a methyl group, an ethyl group, a n-propyl group, a n-butyl group, a t-butyl group, a n-octyl group, a phenyl group and so on. X may be a chlorine atom, a bromine atom or an iodine atom.

To produce the reaction product [A], in the case where the hydropolysiloxane compound represented by the general formula (1) out of the organic silicon compound and the organic magnesium compound are used, the ratio ($R^3 Mg/Si$) of the $R^3 Mg$ in the organic magnesium compound to the silicon atom in the hydropolysiloxane compound is set to 0.05 to 1 (molar ratio). The reaction is performed by adding the organic magnesium compound to compound represented by the general formula (1) diluted with a solvent with stirring. Preferably, the reaction temperature is from −50 to 100° C. and the reaction time is from 30 minutes to 5 hours.

Also, in case of preparing of the reaction product [A] from the compounds represented by general formula(2) composed of a silicon atom to which an organic group and a hydroxyl group are bonded or the condensates thereof and the organic magnesium compound, the ratio ($R^3 Mg/OH$) of $R^3 Mg$ in the organic magnesium compound to OH group in the compounds represented by general formula(2) or the condensates thereof is set to 0.05 to 1(molar ratio), and then, the organic magnesium compound is added to the compounds represented by the general formula(2) with stirring. Preferably, the reaction temperature is from −50 to 100° C. and the reaction time is from 30 minutes to 5 hours.

Generally, the reaction is carried out preferably in an organic solvent. As the organic solvent, any organic solvent may be used. Generally, hydrocarbon solvents are preferred. For example, aliphatic hydrocarbon solvents such as hexane, heptane, cyclohexane, and methylcyclohexane and aromatic hydrocarbon solvents such as benzene, toluene, xylene, and chlorobenzene are used. Of these, in particularly, aromatic hydrocarbon solvents are preferably used.

Next, the reaction product [A] thus obtained is reacted with an alcohol to produce an intermediate product [B]. The alcohol used for the preparation of the intermediate product [B] is preferably a monohydric alcohol having 1 to 4 carbon atoms and specific examples thereof include methanol, ethanol, n-propanol, isopropanol, n-butanol, sec-butanol, t-butanol and so on.

Use of alcohols having 5 or more carbon atoms results in failure of giving good solid fine particles.

The reaction of the reaction product [A] with the alcohol is carried out usually by dropping the alcohol in the reaction product [A] dissolved in the above hydrocarbon solvent with stirring. After completion of the dropping, the mixture is heated at 30 to 200° C., preferably 50 to 150° C., while stirring. The reaction time is 1 to 5 hours. This reaction results in the production of intermediate product [B] in the form of fine particles.

The usage of alcohol is 0.1 to 10 moles, preferably 0.2 to 5 moles, more preferably 0.5 to 3 moles, per gram atom of magnesium in the reaction product [A]. If the usage of alcohol is less than 0.1 mole, the above lower limit, no particle having good shape can be obtained, while the usage of alcohol exceeds 10 moles, the upper limit of the above range, the intermediate product will be readily dissolved in the hydrocarbon solvent used for the dilution of the reaction product [A] so that production of solid fine particles will be insufficient.

To produce the solid reaction product [C] of the present invention, water usually dissolved or suspended in a hydrocarbon solvent is dropped to the intermediate product [B] thus obtained while stirring to allow reaction. After the completion of the dropping, the mixture is heated and stirred for a certain period of time to obtain the solid reaction product [C]. The reaction temperature is 30 to 200° C., preferably 50 to 150° C. and the reaction time is 1 to 5 hours. The hydrocarbon solvent used may be the same as that used in the preparation of the reaction product [A].

The usage of water is 0.1 to 8 moles, preferably 0.2 to 5 moles, more preferably 0.3 to 3 moles, per gram atom of magnesium in the intermediate product [B]. If the usage is greater or smaller than the specified range (0.1 to 8 moles), the catalyst activity decreases greatly and the powder properties of the polymer are aggravated.

The organoaluminum oxy compound [D] used in the preparation of the solid catalyst [F] for olefin polymerization of the present invention is selected from linear alkylaluminoxanes represented by general formula (4)

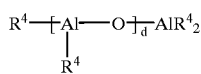  (4)

wherein $R^4$ is a hydrogen atom, a halogen atom or an alkyl group having 1 to 10 carbon atoms, d is an integer of 2 to 40, provided that when $R^4$ is a halogen atom, the possibility that all $R^4$s are halogen atoms is excluded, or cyclic alkylaluminoxanes represented by general formula (5)

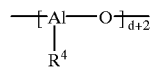  (5)

wherein $R^4$ and d have the same meanings as defined in the general formula (4).

In the case where $R^4$ in the general formulae (4) or (5) is an alkyl group having 1 to 10 carbon atoms, specific examples thereof include a methyl group, an ethyl group, an isobutyl group and so on. In the case where $R^4$ is a halogen atom, it is a chlorine atom or a bromine atom. Further, the compound of the general formulae (4) or (5) may be those that have different $R^4$ groups in the compound. The number of repeating units, d, is selected from the range of from 2 to 40, preferably in the range of form 5 to 20. Among the compounds of the general formulae (4) and (5), in particular those compounds in which $R^4$s are methyl groups only, or a methyl group or groups and other group or groups are preferred.

To synthesize the organoaluminum oxy compound [D] represented by the general formulae (4) or (5), various known methods can be used. For example, it can be synthesized by the method in which a trialkylaluminum is dissolved in a hydrocarbon solvent and water in an amount equivalent to the trialkylaluminum in the solvent is added slowly to hydrolyze it, the method in which hydrated copper sulfate or hydrated aluminum sulfate is suspended in a hydrocarbon solvent and trialkylaluminum is contacted therewith in an amount of 1 to 3 times by equivalent that of the crystal water in the hydrated compound in the suspension to hydrolyze the trialkylaluminum slowly, or the method in which trialkylaluminum is contacted with the adsorption water of non-dehydrated silica gel suspended in a hydrocarbon solvent in an amount of 1 to 3 times by equivalent that of the adsorption water to slowly hydrolyze trialkylaluminum.

The metallocene compound [E] used in the present invention is a compound represented by the following general formulae (6) or (7).

  (6)

wherein M represents titanium, zirconium or hafnium, Cp represents a radical having the cyclopentadienyl skeleton, $R^5$ and $R^6$ represent a hydrogen atom, an alkyl, an alkenyl, an aryl, an alkylaryl, an arylalkyl or an alkylsilyl radical, Y represents a halogen atom, a hydrogen atom, a hydrocarbon radical, a silyl radical, a halogenated hydrocarbon radical, a nitrogen-containing organic radical, an oxygen-containing organic radical or a sulphur-containing organic radical, e and f each is an integer of 0 to 5, m and n each is an integer of 0 to 3, proviso m+n is an integer of 1 to 3,

  (7)

wherein M represents titanium, zirconium or hafnium, Cp represents a radical having the cyclopentadienyl skeleton, $R^5$ and $R^6$ represent a hydrogen atom, an alkyl, an alkenyl, an aryl, an alkylaryl, an arylalkyl or an alkylsilyl radical, R' represents a divalent radical which links $(R^5_g Cp)$ and $(R^6_h Cp)$ and is selected from an alkylene, an arylalkylene, a dialkylsilylene, a dialkylgermylene, an alkylphosphindiyl, an alkylimino or an alkylboranediyl radical, Y represents a halogen atom, a hydrogen atom, a hydrocarbon radical, a silyl radical, a halogenated hydrocarbon radical, a nitrogen-containing organic radical, an oxygen-containing organic radical or a sulphur-containing organic radical, and g and h each represents an integer of 0 to 4.

In the general formulae (6) and (7), the ligand Cp is not critical but may be a grouping having the cyclopentadienyl skeleton and include not only a cyclopentadienyl radical but the cyclopentadienyl radicals in which two vicinal carbon atoms in the cyclopentadienyl ring bond to other carbon atoms to form a 4- or 5- or 6-membered ring. As the cyclopentadienyl radicals in which two vicinal carbon atoms in the cyclopentadienyl ring bond to other carbon atoms to form a 4- or 5- or 6-membered ring, there are mentioned, for example, an indenyl, tetrahydroindenyl, fluorenyl radical and so on.

Also, in the general formulae (6) and (7), $R^5$ and $R^6$ each is preferably, a hydrogen, an alkyl radical having 1 to 20 carbon atoms, an alkenyl radical having 2–20 carbon atoms, an aryl radical having 6 to 20 carbon atoms, an alkylaryl radical having 7 to 20 carbon atoms, an arylalkyl radical having 7 to 20 carbon atoms or an alkylsilyl radical having 3 to 20 carbon atoms.

In the general formula (6), as the grouping $(R^5_e Cp)$ and $(R^6_f Cp)$ having the cyclopentadienyl skeleton, for example, cyclopentadienyl, methylcyclopentadienyl, ethylcyclopentadienyl, n-propylcyclopentadienyl, isopropylcyclopentadienyl, n-butylcyclopentadienyl, isobutylcyclopentadienyl, tert-butylcyclopentadienyl, 1,2-dimethylcyclopentadienyl, 1,3-dimethylcyclopentadienyl, 1,2,4-trimethylcyclopentadienyl, 1,2,3-trimethylcyclopentadienyl, tetramethylcyclopentadienyl, pentamethylcyclopentadienyl, trimethylsilylcyclopentadienyl, trimethylsilyltetramethylcyclopentadienyl, (phenyldimethylsilyl)cyclopentadienyl, triphenylsilylcyclopentadienyl, 1,3-bis(trimethylsilyl)cyclopentadienyl, cyclohexylcyclopentadienyl, allylcyclopentadienyl, benzylcyclopentadienyl, phenylcyclopentadienyl, tolylcyclopentadienyl, indenyl, 1-methylindenyl, 2-methylindenyl, 2,4-dimethylindenyl, 4,7- dimethoxyindenyl, 4,7-dichloroindenyl, 5,6-dimethylindenyl, 2-methyl-4-ethylindenyl, 2-methyl-4,6-diisopropyl-indenyl, naphthylindenyl, 4,5,6,7-tetrahydroindenyl, 2-methyl-tetrahydroindenyl, fluorenyl, 2,7-di-tert-butylfluorenyl.

In the general formula (7), R' represents a divalent radical having 1 to 20 carbon atoms, which links $(R^5_g Cp)$ and $(R^6_h Cp)$, and there are mentioned concretely alkylene, such as methylene, ethylene; alkylidene, such as ethylidene, propylidene, isopropylidene; arylalkylidene, such as phenylmethylidene, diphenylmethylidene; silylene, such as dimethylsilylene, diethylsilylene, dipropylsilylene, diisopropylsilylene, methylethylsilylene, methylisopropylsilylene, methyltertbutylsilylene, methylphenylsilylene, diphenylsilylene; germylene, such as dimethylgermylene, diethylgermylene, dipropylgermylene, diisopropylgermylene, diphenylgermylene, methylethylgermylene, methylisopropylgermylene, methyltertbutylgermylene, methylphenylgermylene, diphenylgermylene; alkylphosphinediyl, such as methylphosphinediyl; alkylimino, such as methylimino; alkylboranediyl, such as methylboranediyl. And, as the grouping R' $(R^5_g Cp)(R^6_h Cp)$ having the cyclopentadienyl skeleton in the general formula (7), for example, ethylenebisindenyl, diphenylmethylenebisindenyl, dimethylsilylenbisindenyl, isopropylidenebisindenyl, dimethylsilylenebistetrahydroindenyl, isopropylidenecyclopentadienyl-1-fluorenyl, diphenylmethylenecyclopentadienyl-1-fluorenyl, dimethylsilylenecyclopentadienyl-1-fluorenyl, dimethylsilylenebis(2,3,5-trimethylcyclopentadienyl), dimethylsilylenebis(2,4-dimethylcyclopentadienyl), dimethylsilylenebis(3-methylcyclopentadienyl), isopropylidenecyclopentadienyl-methylcyclopentadienyl, isopropylidenecyclopentadienyl-2,3,5-trimethylcyclopentadienyl, diphenylmethylenecyclopentadienyl-methylcyclopentadienyl, diphenylmethylenecyclopentadienyl-2,4-dimethylcyclopentadienyl, diphenylmethylenecyclopentadienyl-2,3,5-trimethylcyclopentadienyl, dimethylsilylenecyclopentadienyl-methylcyclopentadienyl, dimethylsilylenecyclopentadienyl-2,4-dimethylcyclopentadienyl, dimethylsilylenecyclopentadienyl-2,3,5-trimethylcyclopentadienyl, isopropylidene-2,4-dimethylcycropentadienyl-1-fluorenyl, diphenylmethylene-2,4-dimethylcyclopentadienyl-1-fluorenyl, dimethylsilylene-2,4-dimethylcyclopentadienyl-1-fluorenyl, cyclohexylidenecyclopentadienyl-1-fluorenyl, dimethylgermylenebis-1-indenyl.

As the metallocene compounds according to the definition of the general formula (6) mentioned above, the following compounds in which Y in the general formula is one of various phenoxy or subsitututed phenoxy radicals may be exemplified:
dicyclopentadienylbis(2-fluorophenoxy)zirconium, dicyclopentadienylbis(3-fluorophenoxy)zirconium, dicyclopentadienylbis(4-fluorophenoxy)zirconium, dicyclopentadienylbis(2-chlorophenoxy)zirconium, dicyclopentadienylbis(3-chlorophenoxy)zirconium, dicyclopentadienylbis(4-chlorophenoxy)zirconium, dicyclopentadienylbis(2-bromophenoxy)zirconium, dicyclopentadienylbis(3-bromophenoxy)zirconium, dicyclopentadienylbis(4-bromophenoxy)zirconium, dicyclopentadienylbis(2-iodophenoxy)zirconium, dicyclopentadienylbis(3-iodophenoxy)zirconium, dicyclopentadienylbis(4-iodophenoxy)zirconium, dicyclopentadienylbis(2,3-difluorophenoxy)zirconium, dicyclopentadienylbis(2,4-difluorophenoxy)zirconium, dicyclopentadienylbis(2,5-difluorophenoxy)zirconium, dicyclopentadienylbis(2,6-difluorophenoxy)zirconium, dicyclopentadienylbis(3,4-difluorophenoxy)zirconium, dicyclopentadienylbis(3,5-difluorophenoxy)zirconium, dicyclopentadienylbis(2,3-dichlorophenoxy)zirconium, dicyclopentadienylbis(2,4-dichlorophenoxy)zirconium, dicyclopentadienylbis(2,5-dichlorophenoxy)zirconium, dicyclopentadienylbis(2,6-dichlorophenoxy)zirconium, dicyclopentadienylbis(3,4-dichlorophenoxy)zirconium, dicyclopentadienylbis(3,5-dichlorophenoxy)zirconium, dicyclopentadienylbis(2,3,4-trifluorophenoxy)zirconium, dicyclopentadienylbis(2,3,5-trifluorophenoxy)zirconium, dicyclopentadienylbis(2,3,6-trifluorophenoxy)zirconium, dicyclopentadienylbis(2,4,5-trifluorophenoxy)zirconium, dicyclopentadienylbis(2,4,6-trifluorophenoxy)zirconium, dicyclopentadienylbis(3,4,5-trifluorophenoxy)zirconium, dicyclopentadienylbis(2,3,5,6-tetrafluorophenoxy)zirconium, dicyclopentadienylbis(pentafluorophenoxy)zirconium, dicyclopentadienylbis(2-fluoromethylphenoxy)zirconium, dicyclopentadienylbis(3-fluoromethylphenoxy)zirconium, dicyclopentadienylbis(4-fluoromethylphenoxy)zirconium, dicyclopentadienylbis(2-chloromethylphenoxy)zirconium, dicyclopentadienylbis(3-chloromethylphenoxy)zirconium, dicyclopentadienylbis(4-chloromethylphenoxy)zirconium, dicyclopentadienylbis(2-trifluoromethylphenoxy)zirconium, dicyclopentadienylbis(3-trifluoromethylphenoxy)zirconium, dicyclopentadienylbis(4-trifluoromethylphenoxy)zirconium, dicyclopentadienylbis(3,5-di-(trifluoromethyl)phenoxy)zirconium, dicyclopentadienylbis(2-(2,2,2-trifluoroethyl)phenoxy)zirconium, dicyclopentadienylbis(3-(2,2,2-trifluoroethyl)phenoxy)zirconium, dicyclopentadienylbis(4-(2,2,2-trifluoroethyl)phenoxy)zirconium, dicyclopentadienylbis(2-trichloromethylphenoxy)zirconium, dicyclopentadienylbis(3-trichloromethylphenoxy)zirconium, dicyclopentadienylbis(4-trichloromethylphenoxy)zirconium, dicyclopentadienylbis(2-methylphenoxy)zirconium, dicyclopentadienylbis(3-methylphenoxy)zirconium, dicyclopentadienylbis(4-methylphenoxy)zirconium, dicyclopentadienylbis(2,3-dimethylphenoxy)zirconium, dicyclopentadienylbis(2,4-dimethylphenoxy)zirconium, dicyclopentadienylbis(2,5-dimethylphenoxy)zirconium, dicyclopentadienylbis(2,6-dimethylphenoxy)zirconium, dicyclopentadienylbis(3,4-dimethylphenoxy)zirconium, dicyclopentadienylbis(3,5-dimethylphenoxy)zirconium, dicyclopentadienylbis(2,3,4-trimethylphenoxy)zirconium, dicyclopentadienylbis(2,3,5-trimethylphenoxy)zirconium, dicyclopentadienylbis(2,3,6-trimethylphenoxy)zirconium, dicyclopentadienylbis(2,4,5-trimethylphenoxy)zirconium, dicyclopentadienylbis(2,4,6-trimethylphenoxy)zirconium, dicyclopentadienylbis(3,4,5-trimethylphenoxy)zirconium, dicyclopentadienylbis(pentamethylphenoxy)zirconium, dicyclopentadienylbis(2-methyl-4-fluorophenoxy)zirconium, dicyclopentadienylbis(2-chloro-4-fluorophenoxy)zirconium, dicyclopentadienylbis(2-chloro-4-trifluoromethylphenoxy)zirconium, dicyclopentadienylbis(2-fluoro-4-trifluoromethylphenoxy)zirconium, dicyclopentadienylbis(2-trifluoromethyl-4-florophenoxy)zirconium, dicyclopentadienylbis(2-ethylphenoxy)zirconium, dicyclopentadienylbis(3-ethylphenoxy)zirconium, dicyclopentadienylbis(4-ethylphenoxy)zirconium, dicyclopentadienylbis(2- isopropyphenoxy)zirconium, dicyclopentadienylbis(3-isopropylphenoxy)zirconium, dicyclopentadienylbis(4-isopropylphenoxy)zirconium, dicyclopentadienylbis(2-tert-butylphenoxy)zirconium, dicyclopentadienylbis(3-tert-butylphenoxy)zirconium, dicyclopentadienylbis(4-tert-butylphenoxy)zirconium, dicyclopentadienylbis(3,5-di-tert-butylphenoxy)zirconium, dicyclopentadienylbis(2-trimethylsilylphenoxy)zirconium, dicyclopentadienylbis(3-trimethylsilylphenoxy)zirconium, dicyclopentadienylbis(4-trimethylsilylphenoxy)zirconium, dicyclopentadienylbis(2-cyclohexylphenoxy)zirconium, dicyclopentadienylbis(3-cyclohexylphenoxy)zirconium, dicyclopentadienylbis(4-cyclohexylphenoxy)zirconium, dicyclopentadienylbis(1-naphthyloxy)zirconium, dicyclopentadienylbis(2-naphthyloxy)zirconium, dicyclopentadienylbis(8-trifluoromethy-1-naphthyloxy)zirconium, dicyclopentadienylbis(2,8-dimethyl-1-naphthyloxy)zirconium, dicyclopentadienylbis(1-tert-butyl-2-naphthyloxy)zirconium, dicyclopentadienylbis(8-bromo-2-naphthyloxy)zirconium, dicyclopentadienylbis(2-phenylphenoxy)zirconium, dicyclopentadienylbis(3-phenylphenoxy)zirconium, dicyclopentadienylbis(4-phenylphenoxy)zirconium, dicyclopentadienylbis(2-benzylphenoxy)zirconium, dicyclopentadienylbis(3-benzylphenoxy)zirconium, dicyclopentadienylbis(4-benzyphenoxy)zirconium, dicyclopentadienylbis(2-tolylphenoxy)zirconium, dicyclopentadienylbis(3-tolylphenoxy)zirconium, dicyclopentadienylbis(4-tolylphenoxy)zirconium, dicyclopentadienylbis(2-vinylphenoxy)zirconium, dicyclopentadienylbis(3-vinylphenoxy)zirconium, dicyclopentadienylbis(4-vinyphenoxy)zirconium, dicyclopentadienylbis(2-(2-propenyl)phenoxy)zirconium, dicyclopentadienylbis(3-(2-propenyl)phenoxy)zirconium, dicyclopentadienylbis(4-(2-propenyl)phenoxy)zirconium, dicyclopentadienylbis(2-methyl-6-(2-propenyl)phenoxy)zirconium, dicyclopentadienylbis(2-ethynylphenoxy)zirconium, dicyclopentadienylbis(3-ethynylphenoxy)zirconium, dicyclopentadienylbis(4-ethynylphenoxy)zirconium, dicyclopentadienylbis(2-methoxyphenoxy)zirconium, dicyclopentadienylbis(3-methoxyphenoxy)zirconium, dicyclopentadienylbis(4-methoxyphenoxy)zirconium, dicyclopentadienylbis(2-tert-butoxyphenoxy)zirconium, dicyclopentadienylbis(3-tert-butoxyphenoxy)zirconium, dicyclopentadienylbis(4-tert-butoxyphenoxy)zirconium, dicyclopentadienylbis(2-phenoxyphenoxy)zirconium, dicyclopentadienylbis(3-phenoxyphenoxy)zirconium, dicyclopentadienylbis(4-phenoxyphenoxy)zirconium, dicyclopentadienylbis(2-formylphenoxy)zirconium, dicyclopentadienylbis(3-formylphenoxy)zirconium, dicyclopentadienylbis(4-formylphenoxy)zirconium, dicyclopentadienylbis(2-acetylphenoxy)zirconium, dicyclopentadienylbis(3-acetylphenoxy)zirconium, dicyclopentadienylbis(4-acetylphenoxy)zirconium, dicyclopentadienylbis(2-benzoylphenoxy)zirconium, dicyclopentadienylbis(3-benzoylphenoxy)zirconium, dicyclopentadienylbis(4-benzoylphenoxy)zirconium, dicyclopentadienylbis(2-methoxycarbonylphenoxy)zirconium, dicyclopentadienylbis(3-methoxycarbonylphenoxy)zirconium, dicyclopentadienylbis(4-methoxycarbonylphenoxy)zirconium, dicyclopentadienylbis(2-acetoxyphenoxy)zirconium, dicyclopentadienylbis(3-acetoxyphenoxy)zirconium, dicyclopentadienylbis(4-acetoxyphenoxy)zirconium, dicyclopentadienylbis(2-cyanophenoxy)zirconium, dicyclopentadienylbis(3-cyanophenoxy)zirconium, dicyclopentadienylbis(4-cyanophenoxy)zirconium, dicyclopentadienylbis(2-nitrophenoxy)zirconium, dicyclopentadienylbis(3-nitrophenoxy)zirconium, dicyclopentadienylbis(4-nitrophenoxy)zirconium, dicyclopentadienylbis(2-anilinophenoxy)zirconium, dicyclopentadienylbis(3-anilinophenoxy)zirconium, dicyclopentadienylbis(4-anilinophenoxy)zirconium, dicyclopentadienylbis(2-dimethylaminophenoxy)zirconium, dicyclopentadienylbis(3-dimethylaminophenoxy)zirconium, dicyclopentadienylbis(4-dimethylaminophenoxy)zirconium, dicyclopentadienylbis(2-dimethylaminomethylphenoxy)zirconium, dicyclopentadienylbis(3-dimethylaminomethylphenoxy)zirconium, dicyclopentadienylbis(4-dimethylaminomethylphenoxy)zirconium, dicyclopentadienylbis(2-formylaminophenoxy)zirconium, dicyclopentadienylbis(3-formylaminophenoxy)zirconium, dicyclopentadienylbis(4-formylaminophenoxy)zirconium, dicyclopentadienylbis(2-acetylaminophenoxy)zirconium, dicyclopentadienylbis(3-acetylaminophenoxy)zirconium, dicyclopentadienylbis(4-acetylaminophenoxy)zirconium, dicyclopentadienylbis(2-thiomethoxyphenoxy)zirconium, dicyclopentadienylbis(3-thiomethoxyphenoxy)zirconium, dicyclopentadienylbis(4-thiomethoxyphenoxy)zirconium, dicyclopentadienylbis(2-thiophenoxyphenoxy)zirconium, dicyclopentadienylbis(3-thiophenoxyphenoxy)zirconium, dicyclopentadienylbis(4-thiophenoxyphenoxy)zirconium, dicyclopentadienylbis(2-methylsulfinylphenoxy)zirconium, dicyclopentadienylbis(3-methylsulfinylphenoxy)zirconium, dicyclopentadienylbis(4-methylsulfinylphenoxy)zirconium, dicyclopentadienylbis(2-mesyiphenoxy)zirconium, dicyclopentadienylbis(3-mesyiphenoxy)zirconium, dicyclopentadienylbis(4-mesyiphenoxy)zirconium, dicyclopentadienylbis(2-tosylphenoxy)zirconium, dicyclopentadienylbis(3-tosylphenoxy)zirconium, dicyclopentadienylbis(4-tosylphenoxy)zirconium, dicyclopentadienylbis(2-trifluoromethanesulfonylphenoxy)zirconium, dicyclopentadienylbis(3-trifluoromethanesulfonylphenoxy)zirconium dicyclopentadienylbis(4-trifluoromethanesulfonylphenoxy)zirconium, dicyclopentadienylbis(2-methylthiophenoxy)zirconium, dicyclopentadienylbis(3-methylthiophenoxy)zirconium, dicyclopentadienylbis(4-methylthiophenoxy)zirconium, dicyclopentadienylbis(2-tert-butylthiophenoxy)zirconium, dicyclopentadienylbis(3-tert-butylthiophenoxy)zirconium, dicyclopentadienylbis(4-tert-butylthiophenoxy)zirconium, dicyclopentadienylbis(2-fluorothiophenoxy)zirconium, dicyclopentadienylbis(3-fluorothiophenoxy)zirconium, dicyclopentadienylbis(4-fluorothiophenoxy)zirconium, dicyclopentadienylbis(2-chlorothiophenoxy)zirconium, dicyclopentadienylbis(3-chorothiophenoxy)zirconium, dicyclopentadienylbis(4-chlorothiophenoxy)zirconium, dicyclopentadienylbis(2-trifluoromethylthiophenoxy)zirconium, dicyclopentadienylbis(3-trifluoromethylthiophenoxy)zirconium, dicyclopentadienylbis(4-trifluoromethylthiophenoxy)zirconium, dicyclopentadienylbis(2-methoxythiophenoxy)zirconium, dicyclopentadienylbis(3-methoxythiophenoxy)zirconium, dicyclopentadienylbis(4-methoxythiophenoxy)zirconium, bis(methylcyclopentadienyl)bis(2-chorophenoxy)zirconium, bis(methylcyclopentadienyl)bis(3-chorophenoxy)zirconium, bis(methylcyclopentadienyl)bis(4-chorophenoxy)zirconium, bis(methylcyclopentadienyl)bis(2-trifluoromethylphenoxy)zirconium, bis(methylcyclopentadienyl)bis(3-trifluoromethylphenoxy)zirconium, bis(methylcyclopentadienyl)bis(4- trifluoromethylphenoxy)zirconium, bis(methylcyclopentadienyl)bis(2-phenylphenoxy)zirconium, bis(methylcyclopentadienyl)bis(3-phenylphenoxy)zirconium, bis(methylcyclopentadienyl)bis(4-phenylphenoxy)zirconium, bis(1,2-dimethylcyclopentadienyl)bis(2-ethylphenoxy)zirconium, bis(1,2-dimethylcyclopentadienyl)bis(3-ethylphenoxy)zirconium, bis(1,2-dimethylcyclopentadienyl)bis(4-ethylphenoxy)zirconium, bis(1,2-dimethylcyclopentadienyl)bis(2,4-diethylphenoxy)zirconium, bis(1,2-dimethylcyclopentadienyl)bis(2,5-diethylphenoxy)zirconium, bis(1,2-dimethylcyclopentadienyl)bis(2-cyanophenoxy)zirconium, bis(1,2-dimethylcyclopentadienyl)bis(3-cyanophenoxy)zirconium, bis(1,2-dimethylcyclopentadienyl)bis(4-cyanophenoxy)zirconium, bis(1,2-dimethylcyclopentadienyl)bis(2-bromophenoxy)zirconium, bis(1,2-dimethylcyclopentadienyl)bis(3-bromophenoxy)zirconium, bis(1,2-dimethylcyclopentadienyl)bis(4-bromophenoxy)zirconium, bis(1,3-dimethylcyclopentadienyl)bis(2-trifluoromethylphenoxy)zirconium, bis(1,3-dimethylcyclopentadienyl)bis(3-trifluoromethylphenoxy)zirconium, bis(1,3-dimethylcyclopentadienyl)bis(4-trifluoromethylphenoxy)zirconium, bis(1,3-dimethylcyclopentadienyl)bis(2-tert-butylphenoxy)zirconium, bis(1,3-dimethylcyclopentadienyl)bis(3-tert-butylphenoxy)zirconium, bis(1,3-dimethylcyclopentadienyl)bis(4-tert-butylphenoxy)zirconium, bis(1,3-dimethylcyclopentadienyl)bis(2-chlorophenoxy)zirconium, bis(1,3-dimethylcyclopentadienyl)bis(3-chlorophenoxy)zirconium, bis(1,3-dimethylcyclopentadienyl)bis(4-chlorophenoxy)zirconium, bis(1,2,3-trimethylcyclopentadienyl)bis(2-fluorophenoxy)zirconium, bis(1,2,3-trimethylcyclopentadienyl)bis(3-fluorophenoxy)zirconium, bis(1,2,3-trimethylcyclopentadienyl)bis(4-fluorophenoxy)zirconium, bis(1,2,3-trimethylcyclopentadienyl)bis(2-isopropylphenoxy)zirconium, bis(1,2,3-trimethylcyclopentadienyl)bis(3-isopropylphenoxy)zirconium, bis(1,2,3-trimethylcyclopentadienyl)bis(4-isopropylphenoxy)zirconium, bis(1,2,3-trimethylcyclopentadienyl)bis(2-nitrophenoxy)zirconium, bis(1,2,3-trimethylcyclopentadienyl)bis(3-nitrophenoxy)zirconium, bis(1,2,3-trimethylcyclopentadienyl)bis(4-nitrophenoxy)zirconium, bis(1,2,4-trimethylcyclopentadienyl)bis(2-trifluoromethylphenoxy)zirconium, bis(1,2,4-trimethylcyclopentadienyl)bis(3-trifluoromethylphenoxy)zirconium, bis(1,2,4-trimethylcyclopentadienyl)bis(4-trifluoromethylphenoxy)zirconium, bis(1,2,4-trimethylcyclopentadienyl)bis(2-methylphenoxy)zirconium, bis(1,2,4-trimethylcyclopentadienyl)bis(3-methylphenoxy)zirconium, bis(1,2,4-trimethylcyclopentadienyl)bis(4-methylphenoxy)zirconium, bis(1,2,4-trimethylcyclopentadienyl)bis(2,4-dimethylphenoxy)zirconium, bis(1,2,4-trimethylcyclopentadienyl)bis(2,4-dichlorophenoxy)zirconium, bis(1,2,4-trimethylcyclopentadienyl)bis(2-tert-butylphenoxy)zirconium, bis(1,2,4-trimethylcyclopentadienyl)bis(3-tert-butylphenoxy)zirconium, bis(1,2,4-trimethylcyclopentadienyl)bis(4-tert-butylphenoxy)zirconium, bis(1,2,3,4-tetramethylcyclopentadienyl)bis(2-methoxyphenoxy)zirconium, bis(1,2,3,4-tetramethylcyclopentadienyl)bis(3-methoxyphenoxy)zirconium, bis(1,2,3,4-tetramethylcyclopentadienyl)bis(4-methoxyphenoxy)zirconium, bis(1,2,3,4-tetramethylcyclopentadienyl)bis(2-iodophenoxy)zirconium, bis(1,2,3,4-tetramethylcyclopentadienyl)bis(3-iodophenoxy)zirconium, bis(1,2,3,4-tetramethylcyclopentadienyl)bis(4-iodophenoxy)zirconium, bis(1,2,3,4-tetramethylcyclopentadienyl)bis(2-thiomethylphenoxy)zirconium, bis(1,2,3,4-tetramethylcyclopentadienyl)bis(3-thiomethylphenoxy)zirconium, bis(1,2,3,4-tetramethylcyclopentadienyl)bis(4-thiomethylphenoxy)zirconium, bis(pentamethylcyclopentadienyl)bis(2-fluorophenoxy)zirconium, bis(pentamethylcyclopentadienyl)bis(3-fluorophenoxy)zirconium, bis(pentamethylcyclopentadienyl)bis(4-fluorophenoxy)zirconium, bis(ethylcyclopentadienyl)bis(2-ethylphenoxy)zirconium, bis(ethylcyclopentadienyl)bis(3-ethylphenoxy)zirconium, bis(ethylcyclopentadienyl)bis(4-ethylphenoxy)zirconium, bis(isopropylcyclopentadienyl)bis(2-acetylphenoxy)zirconium, bis(isopropylcyclopentadienyl)bis(3-acetylphenoxy)zirconium, bis(isopropylcyclopentadienyl)bis(4-acetylphenoxy)zirconium, bis(isopropylcyclopentadienyl)bis(2-methylphenoxy)zirconium, bis(isopropylcyclopentadienyl)bis(3-methylphenoxy)zirconium, bis(isopropylcyclopentadienyl)bis(4-methylphenoxy)zirconium, bis(n-butylcyclopentadienyl)bis(2-chlorophenoxy)zirconium, bis(n-butylcyclopentadienyl)bis(3-chlorophenoxy)zirconium, bis(n-butylcyclopentadienyl)bis(4-chlorophenoxy)zirconium, bis(n-butylcyclopentadienyl)bis(2-trifluoromethylphenoxy)zirconium, bis(n-butylcyclopentadienyl)bis(3-trifluoromethylphenoxy)zirconium, bis(n-butylcyclopentadienyl)bis(4-trifluoromethylphenoxy)zirconium, bis(n-butylcyclopentadienyl)bis(2-tert-butylphenoxy)zirconium, bis(n-butylcyclopentadienyl)bis(3-tert-butylphenoxy)zirconium, bis(n-butylcyclopentadienyl)bis(4-tert-butylphenoxy)zirconium, bis(n-butylcyclopentadienyl)bis(2-cyanophenoxy)zirconium, bis(n-butylcyclopentadienyl)bis(3-cyanophenoxy)zirconium, bis(n-butylcyclopentadienyl)bis(4-cyanophenoxy)zirconium, bis(tert-butylcyclopentadienyl)bis(2-fluorophenoxy)zirconium, bis(tert-butylcyclopentadienyl)bis(3-fluorophenoxy)zirconium, bis(tert-butylcyclopentadienyl)bis(4-fluorophenoxy)zirconium, bis(tert-butylcyclopentadienyl)bis(2-ethylphenoxy)zirconium, bis(tert-butylcyclopentadienyl)bis(3-ethylphenoxy)zirconium, bis(tert-butylcyclopentadienyl)bis(4-ethylphenoxy)zirconium, bis(tert-butylcyclopentadienyl)bis(2,4-dimethylphenoxy)zirconium, bis(1,3-di-tert-butylcyclopentadienyl)bis(2-chlorophenoxy)zirconium, bis(1,3-di-tert-butylcyclopentadienyl)bis(3-chlorophenoxy)zirconium, bis(1,3-di-tert-butylcyclopentadienyl)bis(4-chlorophenoxy)zirconium, bis(1,3-di-tert-butylcyclopentadienyl)bis(2-trifluoromethylphenoxy)zirconium, bis(1,3-di-tert-butylcyclopentadienyl)bis(3-trifluoromethylphenoxy)zirconium, bis(1,3-di-tert-butylcyclopentadienyl)bis(4-trifluoromethylphenoxy)zirconium, bis(phenylcyclopentadienyl)bis(2-phenylphenoxy)zirconium, bis(phenylcyclopentadienyl)bis(3-phenylphenoxy)zirconium, bis(phenylcyclopentadienyl)bis(4-phenylphenoxy)zirconium, bis(phenylcyclopentadienyl)bis(2,4-dichlorophenoxy)zirconium, bis(trimethylsilylcyclopentadienyl)bis(2-tert-butoxyphenoxy)zirconium, bis(trimethylsilylcyclopentadienyl)bis(3-tert-butoxyphenoxy)zirconium, bis(trimethylsilylcyclopentadienyl)bis(4-tert-butoxyphenoxy)zirconium, bis(trimethylsilylcyclopentadienyl)bis(2-phenylphenoxy)zirconium, bis (trimethylsilylcyclopentadienyl)bis(3-phenylphenoxy) zirconium, bis(trimethylsilylcyclopentadienyl)bis(4-phenylphenoxy)zirconium, bis(trimethylsilylcyclopentadienyl)bis(2,4-di-fluorophenoxy) zirconium, bis(cyclohexylcyclopentadienyl)bis(2-iodophenoxy)zirconium, bis(cyclohexylcyclopentadienyl)bis(3-iodophenoxy)zirconium, bis(cyclohexylcyclopentadienyl)bis(4-iodophenoxy) zirconium, bis(indenyl)bis(2-methylphenoxy)zirconium, bis(indenyl)bis(3-methylphenoxy)zirconium, bis(indenyl)bis(4-methylphenoxy)zirconium, bis(1-methylindenyl)bis(2-fluorophenoxy)zirconium, bis(1-methylindenyl)bis(3-fluorophenoxy)zirconium, bis(2-methylindenyl)bis(4-fluorophenoxy)zirconium, bis(2-methylindenyl)bis(2-bromophenoxy)zirconium, bis(2-methylindenyl)bis(3-bromophenoxy)zirconium, bis(2-methylindenyl)bis(4-bromophenoxy)zirconium, bis(5,6-dimethylindenyl)bis(2-isopropylphenoxy)zirconium, bis(5,6-dimethylindenyl)bis(3-isopropylphenoxy)zirconium, bis(5,6-dimethylindenyl)bis(4-isopropylphenoxy)zirconium, bis(5,6-dimethoxyindenyl)bis(2-cyanophenoxy)zirconium, bis(5,6-dimethoxyindenyl)bis(3-cyanophenoxy)zirconium, bis(5,6-dimethoxyindenyl)bis(4-cyanophenoxy)zirconium, bis(fluorenyl)bis(2-chorophenoxy)zirconium, bis(fluorenyl)bis(3-chlorophenoxy)zirconium, bis(fluorenyl)bis(4-chlorophenoxy)zirconium, bis(4,5,6,7-tetrahydroindenyl)bis(2-tert-butylphenoxy)zirconium, bis(4,5,6,7-tetrahydroindenyl)bis(3-tert-butylphenoxy)zirconium, bis(4,5,6,7-tetrahydroindenyl)bis(4-tert-butylphenoxy) zirconium, bis(2-methyltetrahydroindenyl)bis(2-nitrophenoxy)zirconium, bis(2-methyltetrahydroindenyl)bis(3-nitrophenoxy)zirconium, bis(2-methyltetrahydroindenyl)bis(4-nitrophenoxy)zirconium, bis(2,7-di-tert-butylfluorenyl)bis(2-trifluoromethylphenoxy)zirconium, bis(2,7-di-tert-butylfluorenyl)bis(3-trifluoromethylphenoxy) zirconium, bis(2,7-di-tert-butylfluorenyl)bis(4-trifluoromethylphenoxy)zirconium and so on.

Further, in the present invention, in addition to the compounds of the general formula (6) mentioned above, other metallocene compounds in which Y in the general formula (6) is a chlorine atom, a bromine atom, a hydrogen atom, methyl, ethyl, phenyl radical and so on, may be used similarly, the following compounds may be exemplified: bis(cyclopentadienyl)zirconium monochloride monohydride, bis(cyclopentadienyl)zirconium monobromide monohydride, bis(cyclopentadienyl)methyl zirconium hydride, bis(cyclopentadienyl)ethyl zirconium hydride, bis(cyclopentadienyl)phenyl zirconium hydride, bis(cyclopentadienyl)benzyl zirconium hydride, bis(cyclopentadienyl)neopentyl zirconium hydride, bis(methylcyclopentadienyl)zirconium monochloride monohydride, bis(indenyl)zirconium monochloride monohydride, bis(cyclopentadienyl)zirconium dichloride, bis(cyclopentadienyl)zirconium dibromide, bis(cyclopentadienyl)methyl zirconium monochloride, bis(cyclopentadienyl)cyclohexy zirconium monochloride, bis(cyclopentadienyl)phenyl zirconium monochloride, bis(cyclopentadienyl)benzyl zirconium monochloride, bis(methylcyclopentadienyl)zirconium monochloride, bis(methylcyclopentadienyl)zirconium dichloride, bis(dimethylcyclopentadienyl)zirconium dichloride, bis(trimethylcyclopentadienyl)zirconium dichloride, bis(buthylcyclopentadienyl)zirconium dichloride, bis(cyclopentadienyl)zirconium dimethyl, bis(cyclopentadienyl)zirconium diphenyl, bis(cyclopentadienyl)zirconium dibenzyl, bis(indenyl) zirconium dichloride, bis(indenyl)zirconium dibromide, bis(fluoro)zirconium dichloride and so on.

Further, in addition to the metallocene compounds mentioned above, the metallocene compounds in which the zirconium atom of the zirconium compounds as mentioned above of the formula (6) is replaced by a titanium or hafnium atom, also may be used similarly.

On the other hand, as the metallocene compounds represented by the general formula (7), the following compounds in which Y in the general formula is one of various phenoxy radicals may be exemplified:
ethylenebis(indenyl)bis(4-trifluoromethylphenoxy) zirconium, ethylenebis(indenyl)bis(4-fluorophenoxy) zirconium, ethylenebis(indenyl)bis(4-chlorophenoxy) zirconium, ethylenebis(indenyl)bis(2-fluorophenoxy) zirconium, ethylenebis(3-methylindenyl)bis(4-trifluoromethylphenoxy)zirconium, ethylenebis(3-methylindenyl)bis(4-fluorophenoxy)zirconium, ethylenebis(3-methylindenyl)bis(4-chlorophenoxy)zirconium, ethylenebis(3-methylindenyl)bis(2-fluorophenoxy) zirconium, ethylenebis(5,6-dimethylindenyl)bis(4-trifluoromethylphenoxy)zirconium, ethylenebis(5,6-dimethylindenyl)bis(4-fluorophenoxy)zirconium, ethylenebis(5,6-dimethylindenyl)bis(4-chlorophenoxy) zirconium, ethylenebis(5,6-dimethylindenyl)bis(2-fluorophenoxy)zirconium, ethylenebis(4,7-dimethylindenyl)bis(4-trifluoromethylphenoxy)zirconium, ethylenebis(4,7-dimethylindenyl)bis(4-fluorophenoxy) zirconium, ethylenebis(5,6-dimethoxylindenyl)bis(4-trifluoromethylphenoxy)zirconium, ethylenebis(5,6-dimethoxylindenyl)bis(4-fluorophenoxy)zirconium, ethylenebis(5,6-dihydroindenyl)bis(4-trifluoromethylphenoxy)zirconium, ethylenebis(5,6-dihydroindenyl)bis(4-fluorophenoxy)zirconium, ethylenebis(5,6-dihydroindenyl)bis(4-chlorophenoxy)zirconium, ethylenebis(5,6-dihydroindenyl)bis(2-fluorophenoxy) zirconium, ethylenebis(4,5,6,7-tetrahydroindenyl)bis(4-trifluoromethylphenoxy)zirconium, ethylenebis(4,5,6,7-tetrahydroindenyl)bis(4-fluorophenoxy)zirconium, ethylenebis(4,5,6,7-tetrahydroindenyl)bis(4-chlorophenoxy)zirconium, ethylenebis(4,5,6,7-tetrahydroindenyl)bis(2-fluorophenoxy)zirconium, methylenebis(cyclopentadienyl)bis(2-fluorophenoxy) zirconium, methylenebis(cyclopentadienyl)bis(2-ethylphenoxy)zirconium, methylenebis(methylcyclopentadienyl)bis(3-chlorophenoxy)zirconium, methylenebis(1,3-dimethylcyclopentadienyl)bis(2-trifluoromethylphenoxy)zirconium, methylenebis(n-butylcyclopentadienyl)bis(4-tert-butylphenoxy)zirconium, ethylenebis(3-methylcyclopentadienyl)bis(4-trifluoromethylphenoxy)zirconium, ethylenebis(3-methylcyclopentadienyl)bis(4-fluorophenoxy)zirconium, ethylenebis(3-isopropylcyclopentadienyl)bis(4-trifluoromethylphenoxy)zirconium, ethylenebis(3-isopropylcyclopentadienyl)bis(4-fluorophenoxy)zirconium, ethylenebis(3-tert-butylcyclopentadienyl)bis(4-trifluoromethylphenoxy)zirconium, ethylenebis(3-tert-butylcyclopentadienyl)bis(4-fluorophenoxy)zirconium, isopropylidene(cyclopentadienyl)(indenyl)bis(4-trifluoromethylphenoxy)zirconium, isopropylidene(cyclopentadienyl)(indenyl)bis(4-fluorophenoxy)zirconium, isopropylidene(methylcyclopentadienyl)(indenyl)bis(4-trifluoromethylphenoxy)zirconium, isopropylidene(methylcyclopentadienyl)(indenyl)bis(4-fluorophenoxy) zirconium, isopropylidenebis(indenyl)bis(4-trifluoromethylphenoxy)zirconium, isopropylidenebis(indenyl)bis(4-fluorophenoxy)zirconium, isopropylidene(cyclopentadienyl)(fluorenyl)bis(4-trifluoromethylphenoxy)zirconium, isopropylidene (cyclopentadienyl)(fluorenyl)bis(4-fluorophenoxy) zirconium, isopropylidene(3-methylcyclopentadienyl)(fluorenyl)bis(4-trifluoromethylphenoxy)zirconium, isopropylidene(3-methylcyclopentadienyl)(fluorenyl)bis(4-fluorophenoxy)zirconium, tetramethylethylidenebis(2-tert-butylcyclopentadienyl)bis(4-trifluoromethylphenoxy) zirconium, tetramethylethylidenebis(2-tert-butylcyclopentadienyl)bis(4-fluorophenoxy)zirconium, dimethylsilylenebis(indenyl)bis(4-trifluoromethylphenoxy)zirconium, dimethylsilylenebis(indenyl)bis(4-fluorophenoxy)zirconium, dimethylsilylenebis(2-methylidenyl)bis(4-trifluoromethylphenoxy)zirconium, dimethylsilylenebis(2-methylindenyl)bis(4-fluorophenoxy)zirconium, dimethylsilylenebis(2-ethylidenyl)bis(4-trifluoromethylphenoxy)zirconium, dimethylsilylenebis(2-ethylindenyl)bis(4-fluorophenoxy)zirconium, dimethylsilylenebis(2-methyl-5-isopropylindenyl)bis(4-trifluoromethylphenoxy)zirconium, dimethylsilylenebis(2-methyl-5-isopropylindenyl)bis(4-fluorophenoxy)zirconium, dimethylsilylenebis(4,5,6,7-tetrahydroindenyl)bis(4-trifluoromethylphenoxy)zirconium, dimethylsilylenebis(4,5,6,7-tetrahydroindenyl)bis(4-fluorophenoxy)zirconium, dimethylsilylenebis(2-tert-butylcyclopentadienyl)bis(4-trifluoromethylphenoxy)zirconium, dimethylsilylenebis(2-tert-butylcyclopentadienyl)bis(4-fluorophenoxy)zirconium, dimethylsilylenebis(2-tert-butyl-4-methylcyclopentadienyl)bis(4-fluorophenoxy)zirconium, dimethylsilylenebis(2-isopropyl-4-methylcyclopentadienyl)bis(4-fluorophenoxy)zirconium, dimethylsilylene(2,3,5-trimethylcyclopentadienyl)(2,4,5-trimethylcyclopentadienyl)bis(4-fluorophenoxy)zirconium, dimethylsilylene(2,4-dimethylcyclopentadienyl)(3,5-dimethylcyclopentadienyl)bis(4-fluorophenoxy)zirconium, dimethylsilylene(3-tert-butylcyclopentadienyl)(4-tert-butylcyclopentadienyl)bis(4-fluorophenoxy)zirconium, dimethylsilylene(3-methylcyclopentadienyl)(4-methylcyclopentadienyl)bis(4-fluorophenoxy)zirconium, dimethylsilylene(2,4-dimethylcyclopentadienyl)(3-methylcyclopentadienyl)bis(4-fluorophenoxy)zirconium, dimethylsilylene(2,4-dimethylcyclopentadienyl)(4-methylcyclopentadienyl)bis(4-fluorophenoxy)zirconium, dimethylsilylene(3,4-dimethylcyclopentadienyl)(3-methylcyclopentadienyl)bis(4-fluorophenoxy)zirconium, dimethylsilylene(3-tert-butylcyclopentadienyl)(3-methylcyclopentadienyl)bis(4-fluorophenoxy)zirconium, dimethylsilylene(3-tert-butylcyclopentadienyl)(4-methylcyclopentadienyl)bis(4-fluorophenoxy)zirconium, dimethylsilylene(2,3,5-trimethylcyclopentadienyl)(cyclopentadienyl)bis(4-fluorophenoxy)zirconium, dimethylsilylene(2,4-dimethylcyclopentadienyl)(cyclopentadienyl)bis(4-fluorophenoxy)zirconium, dimethylsilylene(3-tert-butylcyclopentadienyl)(cyclopentadienyl)bis(4-fluorophenoxy)zirconium, dimethylsilylene(3-methylcyclopentadienyl)(cyclopentadienyl)bis(4-fluorophenoxy)zirconium, dimethylsilylene(cyclopentadienyl)(indenyl)bis(4-trifluoromethylphenoxy)zirconium, dimethylsilylene(cyclopentadienyl)(indenyl)bis(4-fluorophenoxy)zirconium, diphenylsilylene(indenyl)bis(4-trifluoromethylphenoxy)zirconium, diphenylsilylenebis(indenyl)bis(4-fluorophenoxy)zirconium, dibenzylsilylenebis(indenyl)bis(4-trifluoromethylphenoxy)zirconium, dibenzylsilylenebis(indenyl)bis(4-fluorophenoxy)zirconium, methylphenylsilylenebis(2-methylindenyl)bis(4-trifluoromethylphenoxy)zirconium, methylphenylsilylenebis(2-methylindenyl)bis(4-fluorophenoxy)zirconium, dimethylsilylenebis(3,4-dimethylcyclopentadienyl)bis(4-trifluoromethylphenoxy)zirconium, dimethylsilylenebis(3,4-dimethylcyclopentadienyl)bis(4-fluorophenoxy)zirconium, dimethylsilylenebis(4,5,6,7-tetrahydroindenyl)bis(4-trifluoromethylphenoxy)zirconium, dimethylsilylenebis(4,5,6,7-tetrahydroindenyl)bis(4-fluorophenoxy)zirconium.

Further, in the present invention, in addition to the compounds of the general formula (7) mentioned above, other metallocene compounds in which Y in the general formula (7) is a chlorine atom, a bromine atom, a hydrogen atom, methyl, ethyl, benzyl, phenyl radical and so on, may be used similarly, the following compounds may be exemplified: ethylenebis(indenyl)dimethly zirconium, ethylenebis(indenyl)diethly zirconium, ethylenebis(indenyl)diphenyl zirconium, ethylenebis(indenyl)methly zirconium monochloride, ethylenebis(indenyl)ethly zirconium monochloride, ethylenebis(indenyl)methly zirconium monobromide, ethylenebis(indenyl)zirconium dichloride, ethylenebis(indenyl)zirconium dibromide, dimethylsilylenebis(cyclopentadienyl)zirconium dichloride, dimethylsilylenebis(indenyl)zirconium dichloride, dimethylsilylenebis(methylcyclopentadienyl)zirconium dichloride, dimethylsilylenebis(trimethylcyclopentadienyl) zirconium dichloride, isopropylidene(indenyl)zirconium dichloride, isopropylidene(cyclopentadienylfluorenyl) zirconium dichloride and so on.

In addition to the various metallocene compounds exemplified above, those metallocene compounds obtained by substituting M in the general formula (7) from a zirconium atom to a titanium atom or a hafnium atom may also be used.

The solid catalyst [F] for olefin polymerization used in the present invention can be prepared by contacting the three components, i.e., the solid reaction product [C], organoaluminum oxy compound [D], and metallocene compound [E] each other. The method for contacting the three components is not limited particularly. The three components may be contacted simultaneously or two of the three components may be contacted in advance and then the remaining component may be contacted. Among the methods, the method in which the organoaluminum oxy compound [D] is contacted with the solid reaction product [C] and then the metallocene compound [E] is contacted and the method in which the organoaluminum oxy compound [D] and the metallocene compound [E] are contacted in advance and the obtained product is contacted with the solid reaction product [C] are preferred.

In the above case, it is preferred that the contact be carried out in the presence of an inert solvent of aromatic hydrocarbon such as benzene, toluene, xylene, chlorobenzene and so on, or an aliphatic hydrocarbon such as hexane, heptane, cyclohexane, methylcyclohexane and so on.

After the contacting the three components, the resulting solid catalyst [F] may be used as it is or after washing it with the above inert solvent.

Upon contacting the solid reaction product [C] with the organoaluminum oxy compound [D] and the metallocene compound [E], the usage of the organoaluminum oxy compound [D] based on Al, is 1 to 100 mmol, preferably 5 to 50 mmol, per g of the solid reaction product [C]. The metallocene compound [E] is used in an amount of usually $1\times10^{-5}$ to $5\times10^{-3}$ moles, preferably $5\times10^{-5}$ to $1\times10^{-3}$ moles, per g of the solid reaction product [C].

The solid catalyst [F] in the present invention may be used alone in the polymerization of olefins but it is preferred that it be used together with the organoaluminum compound [G] as a cocatalyst.

The organoaluminum compound [G] used in the polymerization is not limited particularly and trialkylaluminum, organoaluminum oxy compounds or the like may be used. Specific examples of the trialkylaluminum include trimethylaluminum, triethylaluminum, triisobutylaluminum, trihexylaluminum, trioctylaluminum and soon. Also, specific examples of the organoaluminum oxy compound include methylaluminoxane, ethylaluminoxane, isobutylaluminoxane and so on. These may be those having a degree of polymerization of 2 to 40 and being of either a linear or cyclic structure. As the organoaluminum compound [G], mixtures of the exemplified compounds may also be used.

When the solid catalyst [F] is used together with a cocatalyst, these may be added in an inert hydrocarbon solvent or an olefin medium to be provided for polymerization to prepare the polymer. The solid catalyst [F] and cocatalyst may be mixed and contacted each other for a predetermined time in advance before they are used for polymerization or each component may be added separately to the polymerization reaction system. The order in which each component is added may be selected freely.

The solid catalyst [F] of the present invention may be subjected to a treatment by so-called preliminary polymerization in which a relatively small amount of olefin is polymerized before polymerization of olefin. When the preliminary polymerization is performed, the polymerization is carried out until 0.05 to 500 g, preferably 0.1 to 100 g, per g of carried catalyst, of the olefin polymer is produced.

The solid catalyst [F] for olefin polymerization of the present invention is suitable for homopolymerization of ethylene or propylene or copolymerization of ethylene or propylene with 10 mol % or less of an a-olefin, a linear diolefin, a cyclic olefin, a cyclic polyene, or an aromatic vinyl compound, having 3 to 20 carbon atoms.

As α-olefins, for instance, propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, 1-tetradecene, 1-hexadecene, 1-octadecene, 1-eicocene and so on, may be mentioned.

Linear diolefins are, particularly, those having 4 to 20 carbon atoms. For instance, non-conjugated dienes, such as 1,4-pentadiene, 1,4-hexadiene, 1,5-hexadiene, 4-methyl-1, 4-hexadiene, 5-methyl-1,4-hexadiene, 5-methyl-1,5-heptadiene, 1,7-octadiene, 7-methyl-1,6-octadiene and 1,9-decadiene, or conjugated dienes, such as butadiene, isoprene, chloroprene, 1,3-pentadiene and 1,3-hexadiene may be mentioned.

Cyclic olefins are, particularly, those having 4 to 40 carbon atoms. For instance, cyclobutene, cyclopentene, cyclohexene, cycloheptene, cyclooctene, 2-norbornene, 5-methyl-2-norbornene, 5-ethyl-2-norbornene, 5-chloro-2-norbornene, 5-methoxy-2-norbornene, 5,6-dicarboxylnorbornene anhydrate, tetracyclododecene, 5-phenylnorbornene may be mentioned.

Cyclic polyenes are, particularly, those having 5 to 40 carbon atoms. For instance, cyclopentadiene, dicyclopentadiene, norbornadiene, 5-vinyl-2-norbornene, 5-ethylidene-2-norbornene, cyclooctatriene may be mentioned.

In the present invention, the polymerization may be performed by any of polymerization methods such as slurry polymerization, solution polymerization, and gas phase polymerization. However, because of excellent powder properties of the obtained polyolefin, slurry polymerization and gas phase polymerization are used advantageously.

In the present invention, when the solution polymerization or slurry polymerization is practiced, the inert hydrocarbon solvent or the olefin to be provided for polymerization by itself may be used as a solvent. As the inert hydrocarbon solvent, use may be made of an aliphatic hydrocarbon such as butane, isobutane, pentane, hexane, octane and so on; an alicyclic hydrocarbon such as cyclopentane, methylcyclopentane, cyclohexane and so on; an aromatic hydrocarbon such as benzene, toluene, xylene and so on; a petroleum fraction such as naphtha, kerosene, gas oil and so on.

Upon practicing the polymerization in the present invention, the polymerization temperature is usually in the range of −20 to 100° C., preferably in the range of 20 to 90° C., in the case of slurry polymerization, usually in the range of 0 to 120° C., preferably in the range of 20 to 100° C., in the case of gas phase polymerization. When practicing solution polymerization, it is usually in the range of 0 to 300° C., preferably in the range of 100 to 250° C.

The polymerization pressure is not particularly limited but usually a pressure in the range of normal pressure to 10 MPa may be used.

The polymerization in the present invention may be performed by any of batch process, semi-continuous process or continuous process. Further, it is possible to carry out the polymerization in two or more stages differing in reaction conditions. The molecular weight of the obtained olefin polymers can be controlled by causing hydrogen to be present in the polymerization reaction system or by changing the polymerization temperature.

BEST MODE FOR CARRYING OUT THE INVENTION

Hereinafter, the present invention will be explained by examples. However, these are merely illustrative examples and it should not be construed that the present invention is limited thereto.

The methods for measuring physical properties used in the following examples are as follows.

[Molecular weight and molecular weight distribution]

Using gel permeation chromatography (Model 150C. manufactured by Waters Inc.) and 1,2,4-trichlorobenzene as a solvent, measurement was made at 135° C. to obtain weight average molecular weight (Mw) and number average molecular weight (Mn). The ratio of Mw to Mn was obtained to use as an index of molecular weight distribution.

[Bulk density]

Measured by the method of JIS K6721-1966 (When the amount of polymer is small, measurement was made on a ½ scale.)

[Particle size distribution]

In acoustic particle size distribution meter RPS-85 (manufactured by Seishin Corp.), 2 g of polymer was classified with 8 kinds of sieves of from 32 to 250 meshes. 50% particle diameter was defined as an average particle diameter.

[Breadth of particle size distribution]

Measured by the method described in "Shujin Sochi" (Dust Collector), p.15–80, 1965, published by Nikkan Kogyo Shinbunsha;

σ is geometric standard deviation on logarithmic probability paper with smaller value of log σ indicating narrower particle size distribution.

In the following examples, the syntheses of phenoxy group- and substituted phenoxy group-containing metallocene compounds were performed by the method described in the literature (for example, Journal of American Chemical Society 95 (1973) 6263–6267). In this case, the starting compounds used were those commercially available and synthesis was performed always in a Schlenk tube in an

19 argon atmosphere. Other metallocene compounds used were those commercially available.

EXAMPLE 1

(1) Preparation of Reaction Product [A]

In a glass reactor whose inside was well dried and purged with nitrogen was charged 300 ml of tetrahydrofuran solution of n-butylmagnesium chloride (0.67 mol). To this was slowly dropped 42.0 ml of methylhydropolysiloxane with the terminal being substituted with a trimethylsilyl group [Si: 0.7 gram atom, viscosity: about 30 centi-Stokes (25° C.)] with stirring while cooling. After all the amount was added, the mixture was stirred at 70° C. for 1 hour and then cooled to room temperature to obtain a dark brown transparent solution. After adding 400 ml of toluene to the solution, 480 ml of the mixed solution of tetrahydrofuran and toluene was distilled off under reduced pressure of 160 to 170 mmHg. Further, after adding 480 ml of toluene, 480 ml of the mixed solution of tetrahydrofuran and toluene was distilled off in the same manner. The obtained solution was diluted with toluene to obtain 495 ml of toluene solution of reaction product [A] (Mg:1.69 gram atom/l).

(2) Preparation of Intermediate Product [B]

After well drying and nitrogen purging a 500-ml glass reactor equipped with a stirrer with stirring vanes capable of being controlled of stirring speed, dropping funnel and a condenser, 270 ml of toluene was charged therein and further 30 ml (Mg 50.7 milligram atom) of the reaction product [A] produced in (1) above was charged. In the dropping funnel were charged 40 ml of toluene and 3 ml of ethanol (50.7 mmol) and dropped over 30 minutes. Thereafter, the mixture was slowly warmed to 110° C. over 100 minutes and was reacted at 110° C. for 1 hour. Then, the reaction mixture was cooled and the resulting solids were washed with toluene sufficiently to obtain a toluene suspension of intermediate product [B]. The stirring speed during the reaction was 300 $min^{-1}$.

(3) Preparation of Solid Reaction Product [C]

In a glass reactor similar to that in (2) above was charged 242 ml of toluene containing 450 ppm of water and while stirring at 300 $min^{-1}$, 80 ml (Mg, 11 milligram atom) of a toluene suspension of the intermediate product [B] produced in (2) above was dropped. Then, the mixture was warmed to 100° C. and allowed to react for 1 hour and 30 minutes. After cooling, the solid component was washed with toluene to obtain a toluene suspension of solid reaction product [C].

(4) Synthesis of Metallocene Compound [E]

Synthesis of [bis(n-butylcyclopentadienyl)-bis(2-trifluoromethylphenoxy)zirconium]. To 10 ml of a toluene solution of 76.5 mg of bis(n-butylclclopentadienyl) dimethylzirconium was added 67.3 mg of 2-trifluoromethylphenol and the mixture was stirred at room temperature for 1 hour. After completion of the reaction, the solvent toluene was distilled off under reduced pressure to obtain 138.2 mg of colorless oily product. Yield was 99%.

The obtained product was confirmed to be the objective metallocene compound by $^1$H-NMR measurement and elemental analysis. The results are as follows.

Results of $^1$H-NMR: δ 0.74 (t, 6H, J=7.3 Hz), 1.10 (sext, 4H, J=7.5 Hz), 1.30 (quint, 4H, J=7.6 Hz), 2.44 (t, 4H, J=7.6 Hz), 5.96 (t, 4H, J=2.6 Hz), 6.00 (t, 4H, J=2.6 Hz), 6.59 (t, 2H, J=7.6 Hz), 6.83 (d, 2H, J=8.1 Hz), 7.12 (ddd, 2H, J=8.1, 7.6 & 1.5 Hz), 7.49 (dd, 2H, J=7.6 & 1.5 Hz); Results of elemental analysis: C 58.40, H 5.51, Zr 13.46 wt %.

(5) Preparation of Solid Catalyst [F] for Olefin Polymerization

In a glass reactor similar to that in (2) above were charged 0.864 g of the solid reaction product [C] obtained in (3) above and 180 ml of toluene, and cooled to 0° C. On the other hand, in the dropping funnel was introduced 24.2 ml (Al 22.5 milligram atom) of methylaluminoxane (EURECEN Al, 5100/10T manufactured by WITCO CORP. dried up and dissolved again in toluene) as the organoaluminum oxy compound [D] and dropped over 30 minutes while stirring at 300 $min^{-1}$ and stirring was continued for additional 30 minutes. Thereafter, the temperature was returned to room temperature.

Then, 30 ml (0.06 mmol) of a toluene solution of the bis(n-butylcyclopentadienyl)-bis(2-trifluoromethylphenoxy)zirconium was added as the metallocene compound [E], and the mixture was allowed to react at 80° C. for 1 hour. Thereafter, the reaction mixture was cooled to room temperature and the resulting solid component was washed well with toluene and then toluene was removed by distillation. To the resulting solid component was added n-hexane to obtain a hexane suspension of solid catalyst [F] for polymerization.

(6) Polymerization of Ethylene

In an 800-ml stainless steel autoclave whose inside was well dried and purged with ethylene was charged 300 ml of n-hexane and the temperature was elevated to 50° C. Then, 0.5 mmol of triethylaluminum and 17.7 mg of the solid catalyst [F] obtained in (5) above were added in order. After elevating the temperature to 70° C., polymerization was carried out at a polymerization pressure of 0.88 MPa for 1 hour while continuously introducing ethylene. After completion of the polymerization, the polymer was separated from the solvent and dried to obtain 65.9 g of white powder polyethylene. On this occasion, no dirt by adhesion of polyethylene or the like was observed.

The obtained polyethylene had a bulk density of 330 kg/m³, an average particle diameter of 216 μm, and Log σ of 0.11. Fine particles having a particle diameter of 63 μm or less or large particles having a particle diameter of 500 μm or more were not observed. That is, the polyethylene according to the instant example has high bulk density, narrow particle size distribution, contain neither fine particle nor large particle, thus showing good powder properties.

The polymerization activity of the catalyst of the instant example is 3.7 kgPE/gCat, the weight average molecular weight (Mw) of the obtained polyethylene is 227,000, the ratio (Mw/Mn) of the weight average molecular weight to the number average molecular weight was 2.1 so that the molecular weight distribution was narrow.

EXAMPLES 2 and 3

The same operations were repeated as in Example 1 except that stirring speeds upon preparing the intermediate product [B], the solid reaction product [C] and the solid catalyst [F] for olefin polymerization were changed to 350 $min^{-1}$ and 400 $min^{-1}$ to prepare the solid catalyst [F].

Polymerization of ethylene was conducted in the same manner as in Example 1 except that 15.6 mg or 13.7 mg of the obtained solid catalyst [F] was used. The results of polymerization are as shown in Table 1.

TABLE 1

|  |  | Example | | |
|---|---|---|---|---|
|  |  | 1 | 2 | 3 |
| Stirring speed | (min$^{-1}$) | 300 | 350 | 400 |
| Yield | (g) | 65.9 | 54.6 | 56.2 |
| Activity | (kgPE/gCat) | 3.7 | 3.5 | 4.1 |
| Average particle diameter | ($\mu$m) | 216 | 193 | 165 |
| Particle size distribution | (Log $\sigma$) | 0.11 | 0.11 | 0.10 |
| Bulk density | (kg/m$^3$) | 330 | 337 | 335 |
| Mw | ($\times 10^4$) | 22.7 | 20.7 | 21.0 |
| Mw/Mn |  | 2.1 | 2.1 | 2.1 |

As will be apparent from Table 1, the catalyst activity was high and both bulk density and particle size distribution were good. By a simple and easy method of changing the stirring speeds at the time of preparing the intermediate product [B], solid reaction product [C], and solid catalyst [F], the average particle diameter of the obtained polyethylene can be changed. That is, an increasing stirring speed gives a decreasing average particle diameter of polyethylene.

EXAMPLES 4 to 7

Solid catalyst [F] was prepared in the same manner as in Example 1 except that the preparation conditions of the intermediate product [B], solid reaction product [C], and solid catalyst [F] were varied as shown in Table 2.

Polymerization was carried out in the same manner as in Example 1 except that the amount of the solid catalyst used was as shown in Table 2 upon polymerization of ethylene. The conditions and results are shown in Table 2.

TABLE 2

|  | Example | | | |
|---|---|---|---|---|
|  | 4 | 5 | 6 | 7 |
| Alcohol types (ROH) | ethanol | ethanol | ethanol | n-propanol |
| ROH/Mg (mol ratio) | 2/1 | 1/1 | 1/1 | 1/1 |
| Mg/H$_2$O (mol ratio) | 1/0.5 | 1/1 | 1/2 | 1/1 |
| Usage of catalyst (mg) | 17.8 | 6.2 | 11.2 | 12.4 |
| Yield (g) | 42.0 | 20.5 | 20.9 | 29.3 |
| Activity (kgPE/gCat) | 2.4 | 3.3 | 1.9 | 2.4 |
| Average particle diameter ($\mu$m) | 253 | 220 | 198 | 242 |
| Particle size distribution (Log $\sigma$) | 0.11 | 0.10 | 0.10 | 0.13 |
| Bulk density (kg/m$^3$) | 330 | 330 | 320 | 320 |

COMPARATIVE EXAMPLES 1 and 2

In the production of the solid catalyst [F], the same operations as in Example 1 were repeated except that the solid reaction product [C] was produced not via the intermediate product [B]. That is, the reaction of the reaction product [A] with the alcohol was omitted and the reaction product [A] was reacted with water only and the amount of water was varied.

Using the obtained solid catalysts, polymerization of ethylene was performed in the same manner as in Example 1 except that the amounts of catalysts as shown in Table 3 were used. As shown in Table 3, the results indicated that the activities of the catalysts were low, the bulk densities of polyethylenes were very low, and the dirt of the adhesion of the polymer in the autoclave was observed. That is, the activity of catalyst and powder properties were considerably inferior to Example 1.

COMPARATIVE EXAMPLE 3

The reaction operations were performed in the same manner as in Example 1 except that after the reaction product [A] and the alcohol were reacted in Example 1, the reaction of the intermediate product [B] with water was omitted.

Ethylene was polymerized in the same manner as in Example 1 except that the obtained solid catalyst was used in the amount shown in Table 3. The results shown in Table 3 indicate that the polymerization activity was very low.

TABLE 3

|  | Comparative Example | | |
|---|---|---|---|
|  | 1 | 2 | 3 |
| Alcohol types (ROH) | none | none | ethanol |
| ROH/Mg (mol ratio) | 0/1 | 0/1 | 1/1 |
| Mg/H$_2$O (mol ratio) | 1/1 | 1/2 | 1/0 |
| Usage of catalyst (mg) | 30.0 | 30.0 | 22.0 |
| Yield (g) | 33.1 | 17.9 | 10.5 |
| Activity (kgPE/gCat) | 1.1 | 0.6 | 0.5 |
| Bulk density (kg/m$^3$) | 140 | 130 | — |

COMPARATIVE EXAMPLE 4

Anhydrous magnesium dichloride was used as a carrier compound corresponding to the solid reaction product [C] in Example 1. That is, the solid catalyst [F] was prepared by repeating the same operations as in Example 1 except that 0.80 g of anhydrous magnesium dichloride particles obtained by pulverization in a ball mill in a nitrogen atmosphere and classification to 149 $\mu$m or less and drying at 70° C. for 3 hours under reduced pressure, 22.4 ml (20.8 milligram atom of Al) of the same organoaluminum oxy compound [D] as in Example 1, and 28 ml (0.056 mmol) of a toluene solution of bis(n-butylcyclopentadienyl)bis(2-trifluoromethylphenoxy)zirconium as metallocene compound [E] were used.

Polymerization of ethylene was performed in the same manner as in Example 1 except that 17.4 mg of the solid catalyst [F] was used. As a result, 11.6 g of polyethylene was obtained as white powder. In this case, the activity of catalyst was very low (0.67 kgPE/gCat). The particles of polyethylene were of bad shape and not uniform.

EXAMPLES 8 to 11

The solid catalyst [F] was prepared by repeating the same operations as in Example 1 except that in Example 1, the kind and amount of metallocene compound were varied as shown in Table 4.

Ethylene was polymerized in the same manner as in Example 1 except that the obtained solid catalyst [F] was used in catalyst amounts shown in Table 4. The results are as shown in Table 4. In the case of each solid catalyst [F], the polyethylene had high bulk density and narrow particle size distribution. In each case, no adhesion of polymer or the like on the inner wall of autoclave was observed.

TABLE 4

| | | Example | | | |
|---|---|---|---|---|---|
| | | 8 | 9 | 10 | 11 |
| Metallocene compound | | (n-BuCp)$_2$ZrCl$_2$ | Et(Ind)$_2$ZrCl$_2$ | (1,2,4-Me$_3$Cp)$_2$ZrCl$_2$ | (n-BuCp)$_2$HfCl$_2$ |
| Metallocene compound/ Solid reaction product [C] | (mmol/g) | 0.07 | 0.07 | 0.10 | 0.17 |
| Usage of catalyst (mg) | | 11.8 | 33.0 | 29.1 | 28.7 |
| Yield (g) | | 42.5 | 45.1 | 50.9 | 37.3 |
| Activity (kgPE/gCat) | | 3.6 | 1.4 | 1.7 | 1.3 |
| Average particle diameter | ($\mu$m) | 223 | 184 | 172 | 187 |
| Particle size distribution | (Log $\sigma$) | 0.11 | 0.13 | 0.10 | 0.13 |
| Bulk density (kg/m$^3$) | | 340 | 320 | 320 | 310 |
| Mw ($\times 10^4$) | | 20.7 | — | 21.0 | — |
| Mw/Mn | | 2.1 | — | 2.1 | — |

The names of compounds in the tables are as follows. (n-BuCp)$_2$ZrCl$_2$: Bis(n-butylcyclopentadienyl)zirconium dichloride Et(Ind)$_2$ZrCl$_2$: Ethylenebis(indenyl)zirconium dichloride (1,2,4-Me$_3$Cp)$_2$ZrCl$_2$: Bis(1,2,4-trimethylcyclopentadienyl)zirconium dichloride (n-BuCp)$_2$HfCl$_2$: Bis(n-butylcyclopentadienyl)hafnium dichloride

EXAMPLE 12

Copolymerization of Ethylene with 1-hexene

Copolymerization of ethylene with 1-hexene was performed using the solid catalyst [F] of Example 1. The same operations as in Example 1 were repeated except that upon polymerization operations, 5 ml of 1-hexene was charged following the charging of n-hexane and 15.5 mg of the solid catalyst [F] was used. After completion of the copolymerization, the obtained polymer was separated from the solvent and dried to obtain 54.3 g of ethylene copolymer as white powder. No dirt by adhesion of polymer in the autoclave was obserbed. The obtained ethylene copolymer had a bulk density of 300 kg/m$^3$, an average particle diameter of 195 $\mu$m, and Log $\sigma$ of 0.14, and contained no fine particle having a particle diameter of 63 $\mu$m or less nor large particle having a particle diameter of 500 $\mu$m or more. That is, there was obtained ethylene copolymer having good powder properties such that it has high bulk density, narrow particle size distribution and good powder properties and contains neither fine particle nor large particle.

The activity of the catalyst of the instant example was 3.5 kgPE/gCat and the content of 1-hexene in the copolymer was 0.41 mol %.

When the metallocene-containing solid catalyst for olefin polymerization of the present invention is used in the polymerization or copolymerization of olefins, the following features are obtained. (1) It shows catalyst activity without requiring any deashing treatment such as removal of the catalyst. (2) The produced polymer has good powder properties such that it has high bulk density and narrow particle size distribution and fine particles and large particles are very few. (3) The particle size of the polymer can be controlled by a simple and easy manner of changing the stirring speed upon production of catalyst. (4) No adhesion of polymer onto the inner wall of autoclave occurs.

As stated above, because of excellent catalyst activity upon polymerization, powder properties and resistance to adhesion onto the wall of polymerization reactor, the catalyst of the present invention causes no trouble during its production process so that it enables stable long-term operation or an increase in productivity.

What is claimed is:

1. A solid catalyst for olefin polymerization, obtained by reacting at least one of a hydropolysiloxane compound having a structural unit represented by general formula, $R^1{}_aH_bSiO_{(4-a-b)/2}$ (wherein $R^1$ is a monovalent organic group selected from at least one of an alkyl group, an aryl group, an aralkyl group, an alkoxy group, and an aryloxy group, where a is an integer of 0 to 2 and b is integer of 1 to 3, provided that a+b$\leq$3), a silane compound composed of silicon atom to which at least one organic group and at least one hydroxyl group are bonded, represented by general formula, $R^2{}_cSi(OH)_{4-c}$ (wherein $R^2$ is a monovalent hydrocarbon group having 1 to 18 carbon atoms and c is an integer of 1 to 3), and condensates of the silane compound with an organic magnesium compound represented by general formula $(MgR^3{}_2)_p \cdot (R^3MgX)_q$ (wherein $R^3$ is a hydrocarbon group, X is a halogen atom, p and q are numbers of 0 to 1, provided that p+q=1) to form a reaction product, reacting the reaction product with an alcohol having 1 to 4 carbon atoms to obtain an intermediate product, reacting the intermediate product with water to obtain a solid reaction product, and having an organoaluminum oxy compound and a metallocene compound carried on the solid reaction product.

2. The solid catalyst for olefin polymerization as claimed in claim 1, wherein the metallocene compound is a compound represented by general formula (6) or (7) below:

$$(R^5{}_eCp)_m(R^6{}_fCp)_nM(Y)_{4-(m+n)} \tag{6}$$

wherein M represents titanium, zirconium or hafnium, Cp represents a radical having the cyclopentadienyl skeleton, $R^5$ and $R^6$ represent a hydrogen atom, an alkyl, an alkenyl, an aryl, an alkylaryl, an arylalkyl or an alkylsilyl radical, Y represents a halogen atom, a hydrogen atom, a hydrocarbon radical, a silyl radical, a halogenated hydrocarbon radical, a nitrogen-containing organic radical, an oxygen-containing organic radical or a sulphur-containing organic radical, e and f each is an integer of 0 to 5, m and n each is an integer of 0 to 3, proviso m+n is an integer of 1 to 3,

$$R'(R^5{}_gCP)_m(R^6{}_hCp)_nM(Y)_2 \tag{7}$$

wherein M represents titanium, zirconium or hafnium, Cp represents a radical having the cyclopentadienyl skeleton, $R^5$ and $R^6$ represent a hydrogen atom, an alkyl, an alkenyl, an aryl, an alkylaryl, an arylalkyl or an alkylsilyl radical, R' represents a divalent radical which links $(R^5_g Cp)$ and $(R^6_h Cp)$ and is selected from an alkylene, an arylalkylene, a dialkylsilylene, a dialkylgermylene, an alkylphosphindiyl, an alkylimino or an alkylboranediyl radical, Y represents a halogen atom, a hydrogen atom, a hydrocarbon radical, a silyl radical, a halogenated hydrocarbon radical, a nitrogen-containing organic radical, an oxygen-containing organic radical or a sulphur-containing organic radical, and g and h each represents an integer of 0 to 4.

3. A process for producing an olefinic polymer comprising polymerizing or copolymerizing olefin in the presence of the solid catalyst for olefin polymerization as claimed in claim 1, and an organoaluminum compound.

4. A process for producing an olefinic polymer comprising polymerizing or copolymerizing olefin in the presence of the solid catalyst for olefin polymerization as claimed in claim 2, and organoaluminum compound.

* * * * *